United States Patent
Zoiss et al.

[11] Patent Number: 5,841,857
[45] Date of Patent: Nov. 24, 1998

[54] TELEPHONE TEST SET LCD PANEL CARRIER

[75] Inventors: Edward J. Zoiss, Moorpark, Calif.; Joseph E. Gleason, Eagan, Minn.

[73] Assignee: Harris Corporation, Melbourne, Fla.

[21] Appl. No.: 753,101

[22] Filed: Nov. 20, 1996

[51] Int. Cl.$^6$ .................................................. H04M 1/02
[52] U.S. Cl. .............................. 379/428; 379/433; 455/90
[58] Field of Search .................................. 379/428, 433; 455/575, 90, 128, 347, 350, 351

[56] References Cited

U.S. PATENT DOCUMENTS

| | | | |
|---|---|---|---|
| 4,712,236 | 12/1987 | Brown et al. | 379/433 |
| 4,983,008 | 1/1991 | Campbell et al. | 350/96.16 |
| 5,002,368 | 3/1991 | Anglin | 350/334 |
| 5,386,084 | 1/1995 | Risko | 174/52.3 |
| 5,475,752 | 12/1995 | Mischenko | 379/433 |
| 5,546,457 | 8/1996 | Tomura et al. | 379/368 |

FOREIGN PATENT DOCUMENTS

| | | |
|---|---|---|
| 0702478A2 | 3/1996 | European Pat. Off. ......... H04M 1/02 |
| 2 135 088 | 8/1984 | United Kingdom . |
| 2 264 583 | 9/1993 | United Kingdom . |
| 2 190 529 | 11/1997 | United Kingdom . |

*Primary Examiner*—Jack Chiang
*Assistant Examiner*—Shih-Wen Hsieh

[57] ABSTRACT

A unitary mounting carrier structure supports a display panel and acoustic transducer components within a housing sub-portion of a telephone test set containing a keypad, an earpiece receiver port, a display panel face, and an auxiliary speaker port at an end portion of the test set. The unitary carrier structure is generally wedge-configured and has a generally flat, liquid crystal display panel unit-mounting section upon which a shock-absorbing gasket assembly containing a display panel unit is mounted. An earpiece receiver-mounting section is contiguous with a wider end of the carrier, and is contiguous with the generally flat, display panel unit-mounting section. An auxiliary speaker-mounting section is supported by the carrier adjacent and transverse to the earpiece receiver-mounting section. A desiccant-retaining section is supported adjacent to the display panel unit-mounting section, and serves to reduce the dew point within the test set to a value in a range on the order of 0°–65° F., thereby preventing the display panel unit from 'fogging-up', as may otherwise occur when the test set is taken from an air-conditioned vehicle to a warm and humid outdoor environment.

33 Claims, 8 Drawing Sheets

TELEPHONE TEST SET LCD PANEL CARRIER

CROSS-REFERENCE TO RELATED APPLICATIONS

The present application relates to subject matter disclosed in coincidentally filed U.S. Patent applications: Ser. No. 08/754,077, entitled "Telephone Test Set Keypad with Integrated Microphone," by E. Zoiss et al; Ser. No. 08/754,075, now U.S. Pat. No. 5,755,590, which issued May 26, 1998 entitled "Line Cord Strain Relief Attachment for Telephone Test Set," by E. Zoiss et al; and Ser. No. 08/754,076, entitled "Variable Geometry Battery Compartment for Accommodating Different Sized Batteries in Telephone Craftsperson's Test Set," by E. Zoiss et al; and U.S Design Patent application Ser. No. 29/061,617, entitled: "ISDN Test Set," by Roy Soto et al, filed Oct. 29, 1996, which is a continuation-in-part of U.S Design Patent application Ser. No. 29/053,246, entitled: "ISDN Test Set," by Roy Soto et al, filed Apr. 18, 1996, each of the above applications being assigned to the assignee of the present application and the disclosures of which are herein incorporated.

FIELD OF THE INVENTION

The present invention relates in general to portable communication devices, such as telephone craftsperson's test sets, and is particularly directed to a new and improved one-piece carrier configuration for mounting a plurality of components within a telephone test set, including the shock-mounting of a liquid crystal display (LCD) panel unit.

BACKGROUND OF THE INVENTION

Portable telecommunication devices, including but not limited to telephone craftsperson's test sets, are often exposed to a variety of physical hazards, including severe physical handling (e.g., jarring as the result of being dropped), as well as moisture and foreign matter in the environment in which the test set is being used. Delicate components such as liquid crystal display panels and the like are particularly prone to damage from severe vibration and must be installed in a shock-resistant manner. Thus, it is necessary to provide a structural housing configuration for such equipment that is both physically robust, and provides a barrier against the effects of humidity, such as the fogging of a viewing panel. While meeting these objectives is a fairly straightforward exercise if there are no constraints on the size and weight of the housing and support structure, doing so in a relatively confined physical volume of a hand-held device, especially one having a predefined curvilinear hand-conformal geometric that shape which inherently limits the number of parts that can be used, presents a major challenge to the test set designer.

SUMMARY OF THE INVENTION

In accordance with the present invention, the above objectives for a mounting assembly within a utility device, such as a physically compact, 'palm of the hand-conformal' telephone test set, are successfully achieved by means of a new and improved shock-resistant display panel and audio device mounting arrangement, that is configured to support a plurality of components, including the humidity barrier, shock-mounting of an LCD panel unit, together with an earpiece and an auxiliary speaker, within a limited volume region of the utility device.

The telephone test set itself may be generally configured as described and illustrated in the above-referenced applications, having a multi-section rear housing portion, and a front housing portion. The front housing portion of the test set has a front face, containing a keypad, an earpiece receiver port, a microphone grill and a display panel face. The display panel face has a lens that overlies a visual display device, such as an LCD display unit, which is integrally mounted in a shock-resistant and moisture-resistant, single-piece carrier configuration, that supports the LCD display unit and a plurality of other test set components within a wedge-shaped portion of the interior volume of the test set, subtended by an end region of the front housing portion. A top end of the front housing portion also has a plurality of audio transmission slots for an auxiliary speaker.

As will be described, for installation in a telephone test set, the mounting arrangement according to the present invention is comprised of a unitary (single molded piece of plastic) carrier, that generally conforms with a tapered interior volume portion of a telephone test set, such as a housing portion exclusive of a battery compartment. The unitary carrier has a first portion that is configured to support a display panel unit, such as one having a liquid crystal display panel, in a shock-resilient manner adjacent to a viewing panel of the utility device, and a second portion that is configured to support an acoustic transducer, such as an earpiece receiver and/or an auxiliary speaker.

When installed in the test set, the first portion of the mounting arrangement may be located at a display panel portion of the test set adjacent to a keypad thereof, and the second portion disposed adjacent to earpiece receiver and auxiliary speaker ports of the telephone test set. The carrier is also configured to maintain a visibility condition of the display panel unit irrespective of ambient humidity conditions in which the device is used. For this purpose, the carrier includes a third portion which contains a desiccant that is in fluid communication with the first portion. The desiccant reduces the dew point of the interior volume of the test set to a value in a range on the order of 0°–65° F., to prevent 'fogging' the LCD panel unit.

In order to support the display panel unit in a shock-resilient manner the first portion of the carrier includes a shock-absorbing structure having shock-absorbing mounting gaskets disposed on opposite sides of the display panel. An upper shock-absorbing mounting gasket is disposed atop the display panel unit, and a lower shock-absorbing mounting gasket is between the display panel unit the first portion of the carrier. In addition, the upper shock-absorbing mounting gasket is configured to attach display panel unit and the lower shock-absorbing mounting gasket to the carrier.

For this purpose, the first portion of the carrier has a generally flat floor region configured to support the lower shock-absorbing mounting gasket, and the upper mounting gasket has attachment elements, configured as generally T-shaped tines, that are configured to engage slots in the display panel unit, the lower shock-absorbing mounting gasket and the carrier. The upper mounting gasket has a window that conforms with a display face of the display panel unit, and further includes an integrally molded dual gasket, comprised of an earpiece receiver gasket portion sized to fit with the earpiece receiver and a speaker gasket portion sized to fit with the auxiliary speaker.

A generally flat floor portion of the first portion of the carrier has an aperture that accommodates passage of components of the display panel unit and the earpiece receiver. The desiccant-retaining section is disposed beneath the display panel unit-mounting section and has wedge-shaped troughs arranged to support a plurality of desiccant elements.

DETAILED DESCRIPTION

Figure 1:
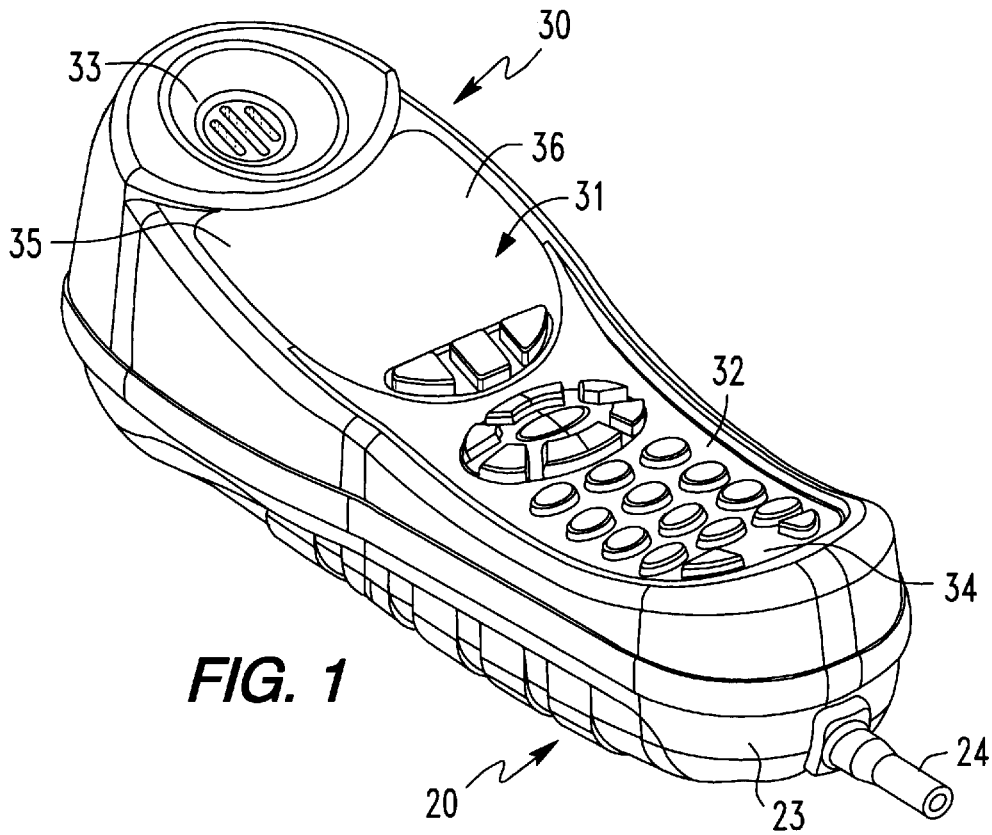
FIG. 1 is a perspective view showing the front keypad face of a telephone craftsperson's test set described and illustrated in the above-referenced applications.
Figure 2:
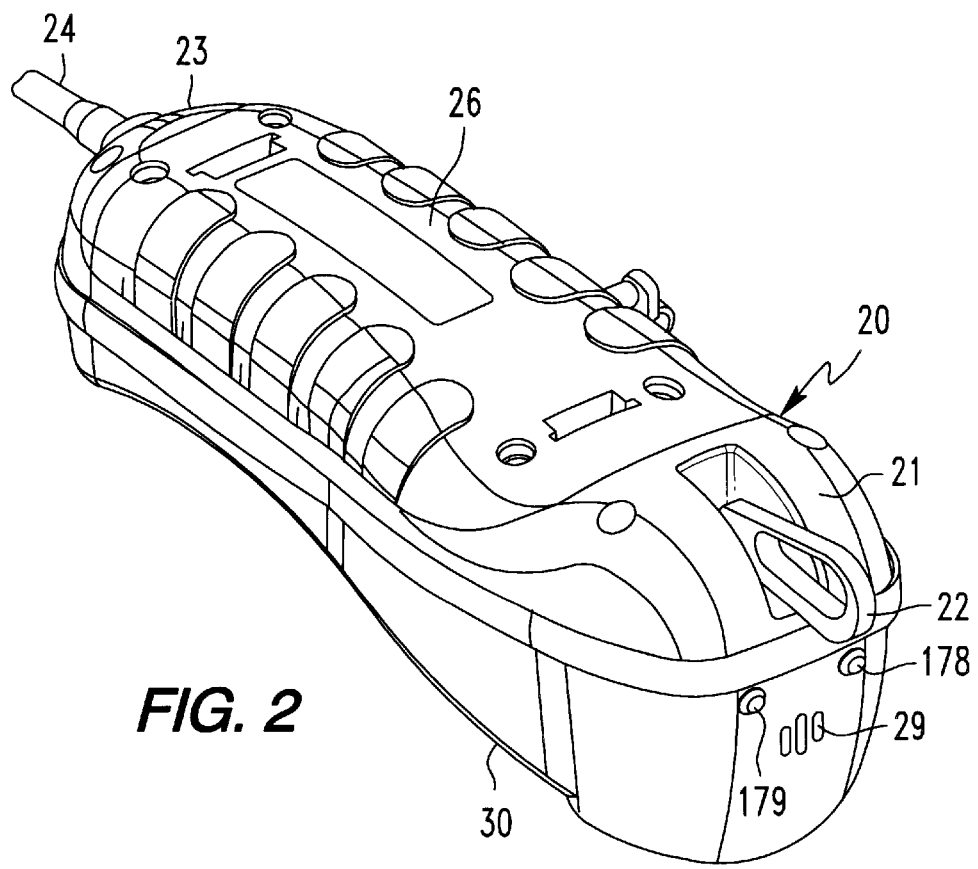
FIG. 2 is a perspective rear view of the test set of FIG. 1.
Figure 3:
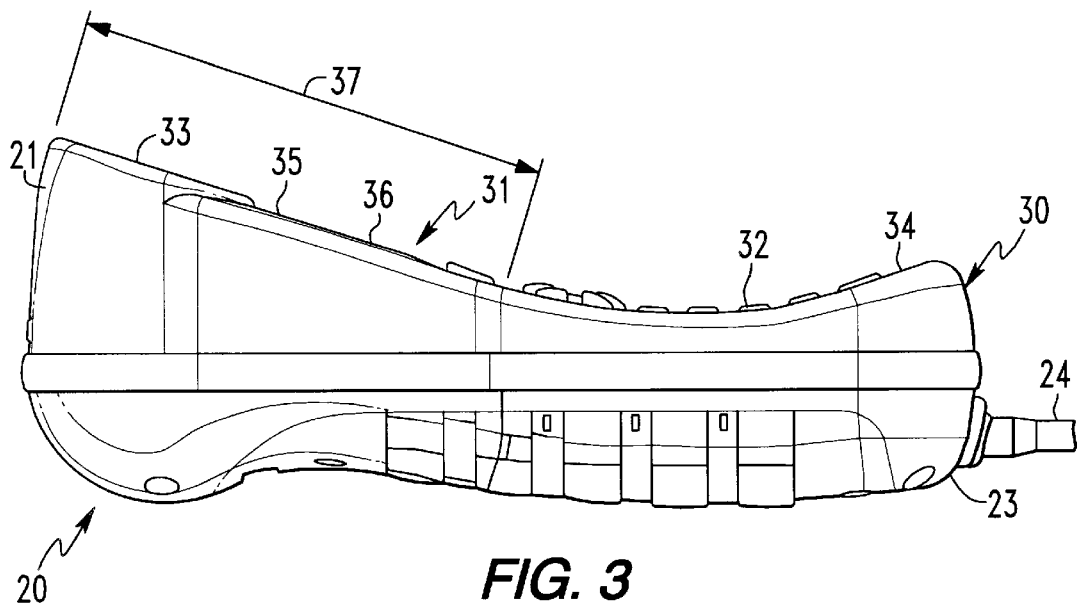
FIG. 3 is a side view of the test set of FIGS. 1 and 2.
Figure 5:
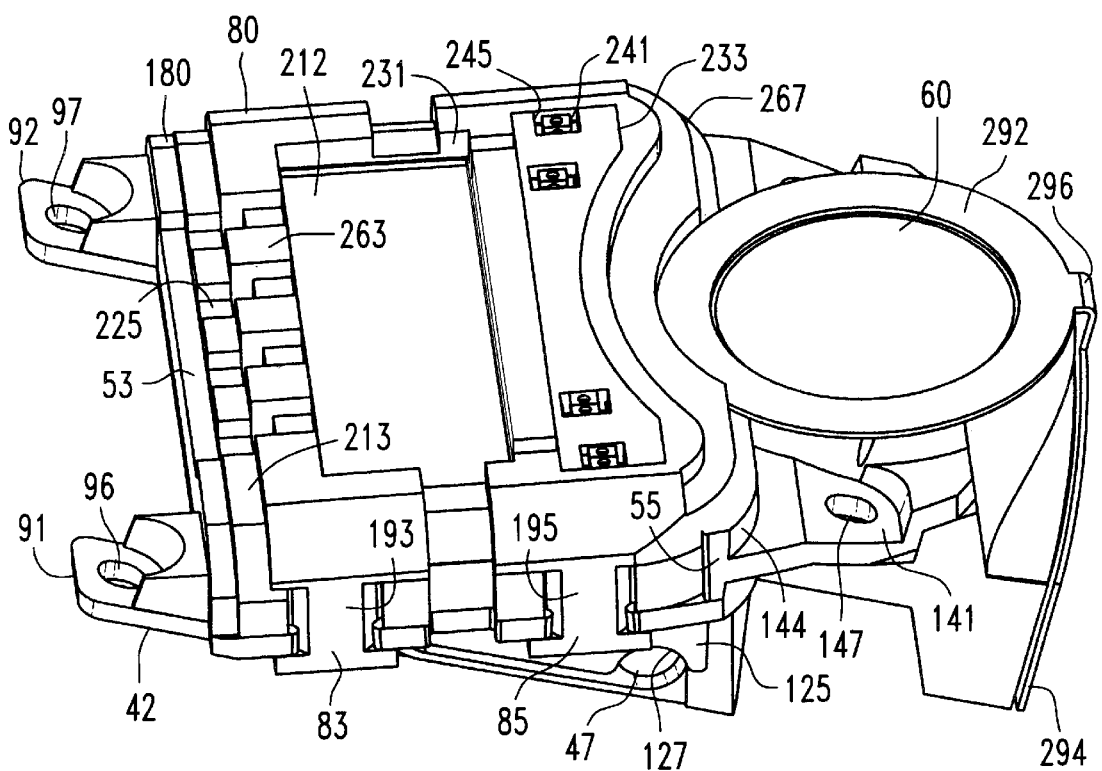
FIG. 5 is a topside perspective view of the assembled shock-resistant display panel and audio device mounting arrangement of FIG. 4.
Figure 4:
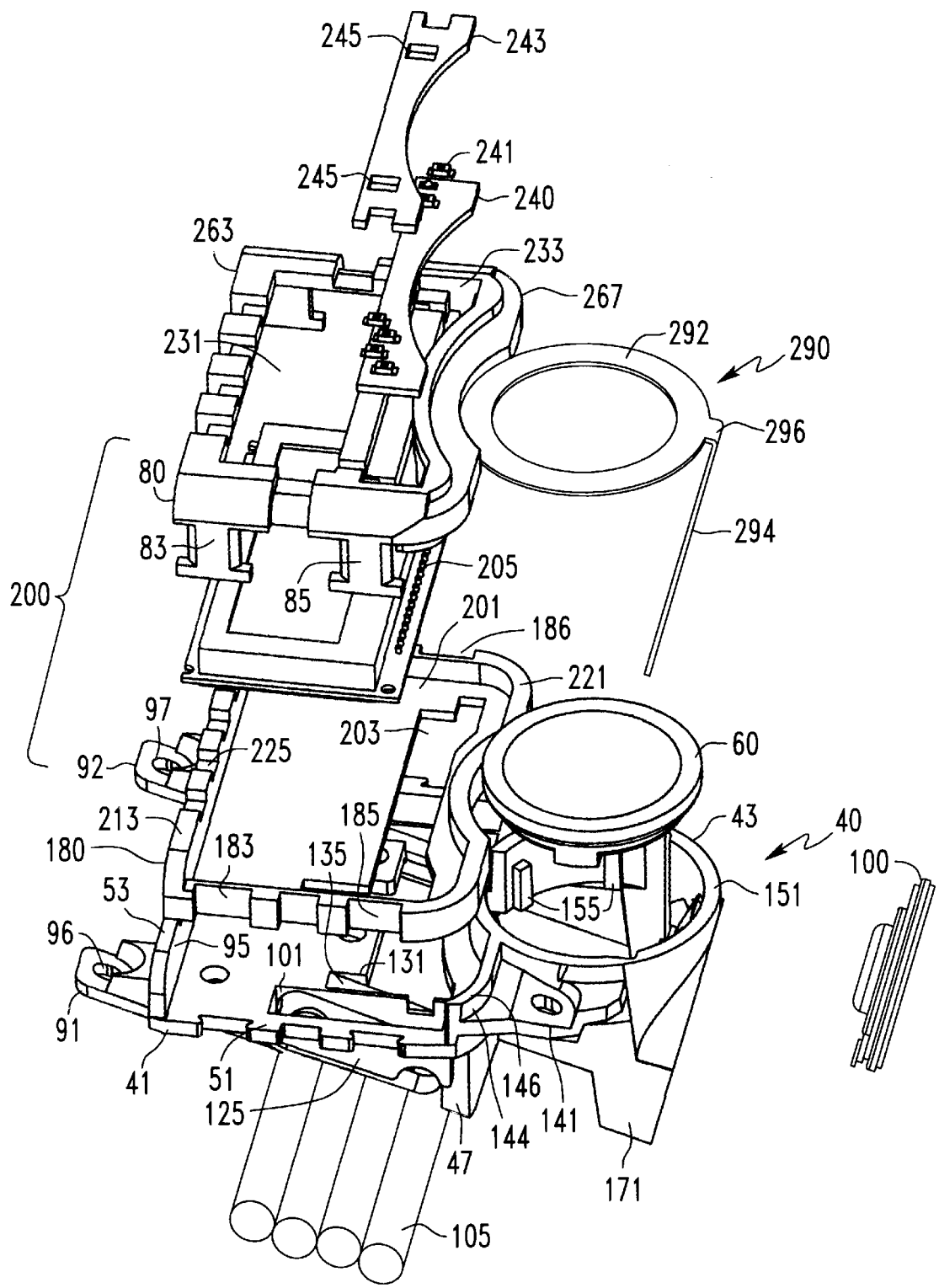
FIG. 4 is an exploded topside perspective view of the shock-resistant display panel and audio device mounting arrangement of the present invention.
Figure 6:
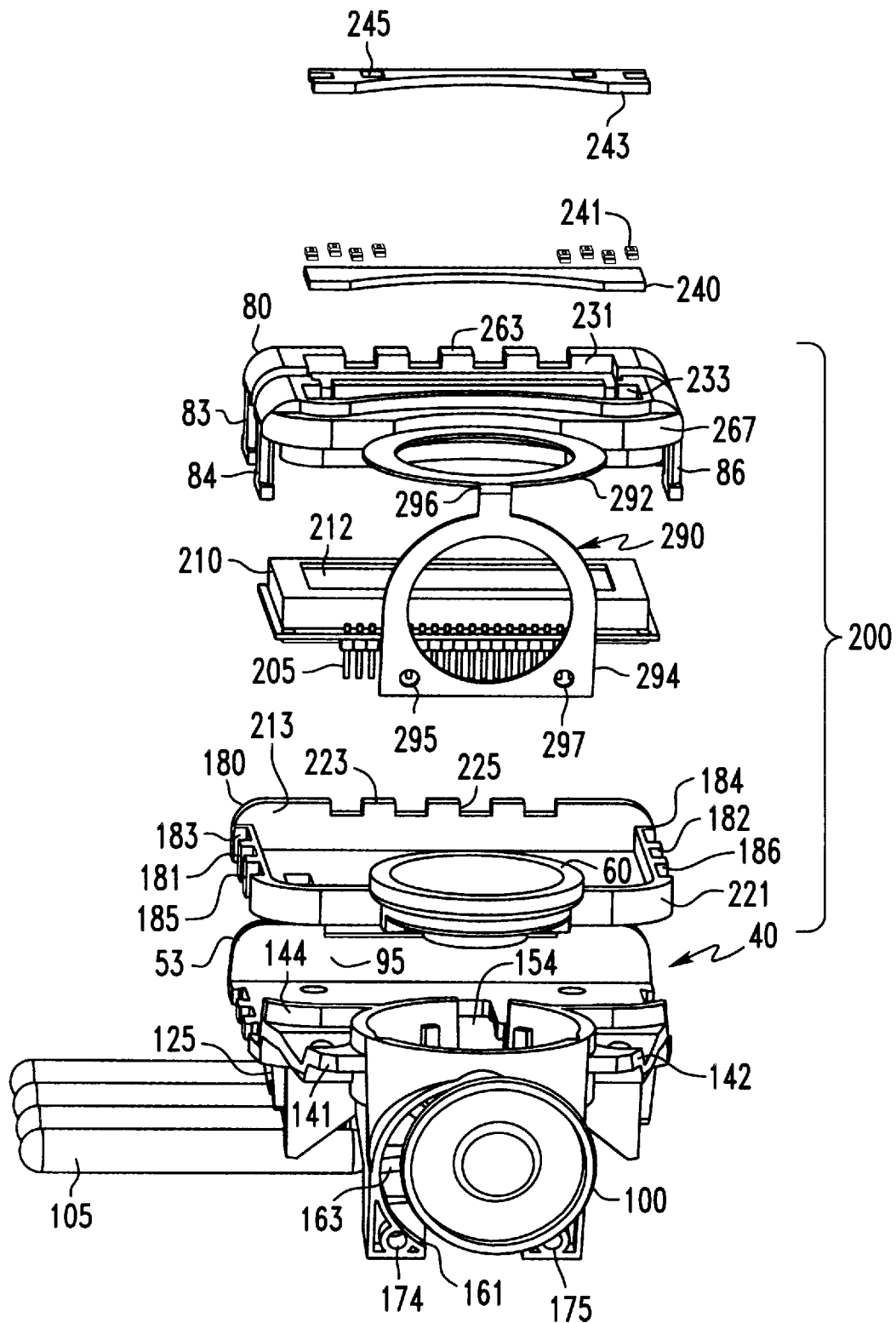
FIG. 6 is an exploded front perspective view of the shock-resistant display panel and audio device mounting arrangement of FIGS. 4 and 5.
Figure 7:
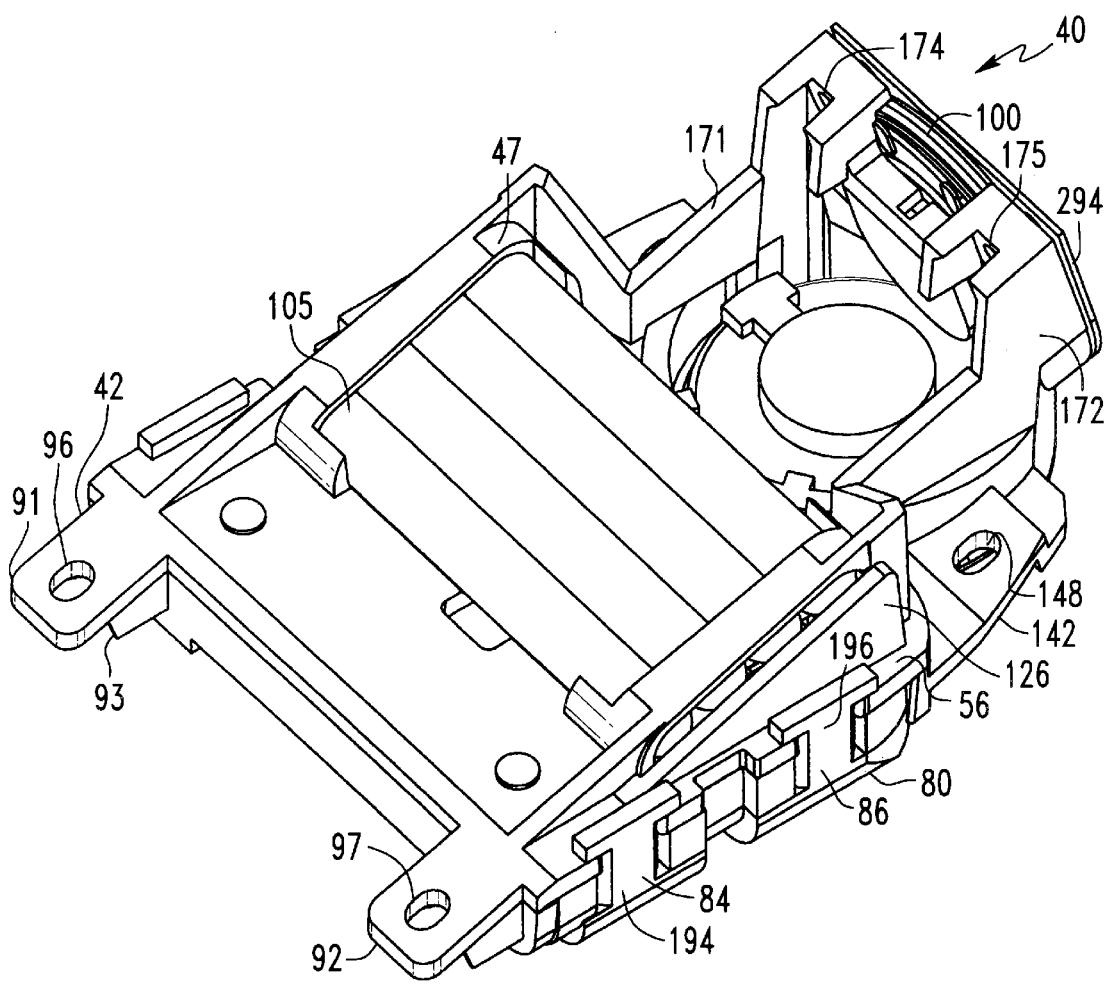
FIG. 7 is a bottom perspective view of the assembled shock-resistant display panel and audio device mounting arrangement of FIGS. 4–6.
Figure 8:
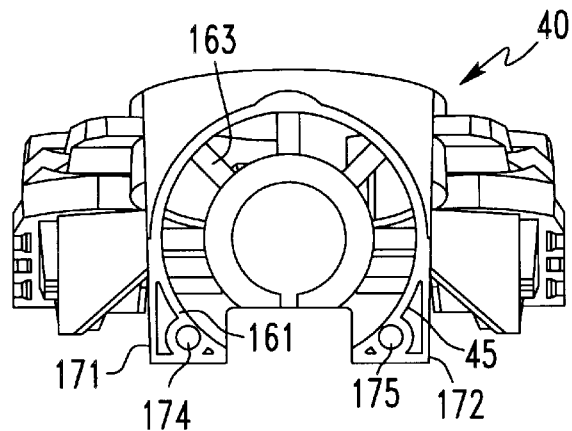
FIG. 8 is a front, speaker end view of the one piece molded carrier employed in the mounting arrangement illustrated in FIGS. 4–7.
Figure 9:
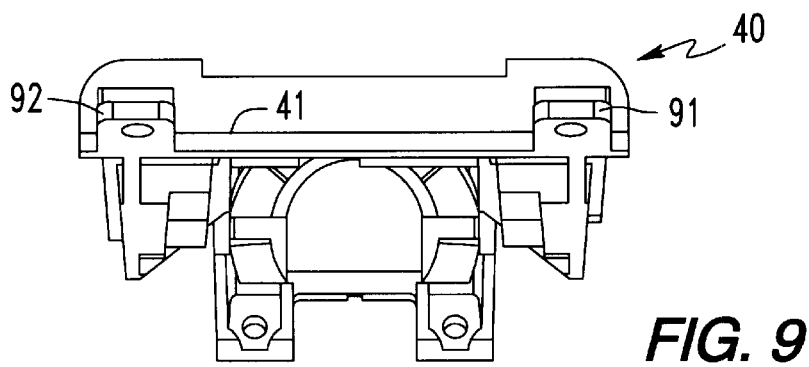
FIG. 9 is a rear end view of the one piece molded carrier of FIG. 8.
Figure 10:
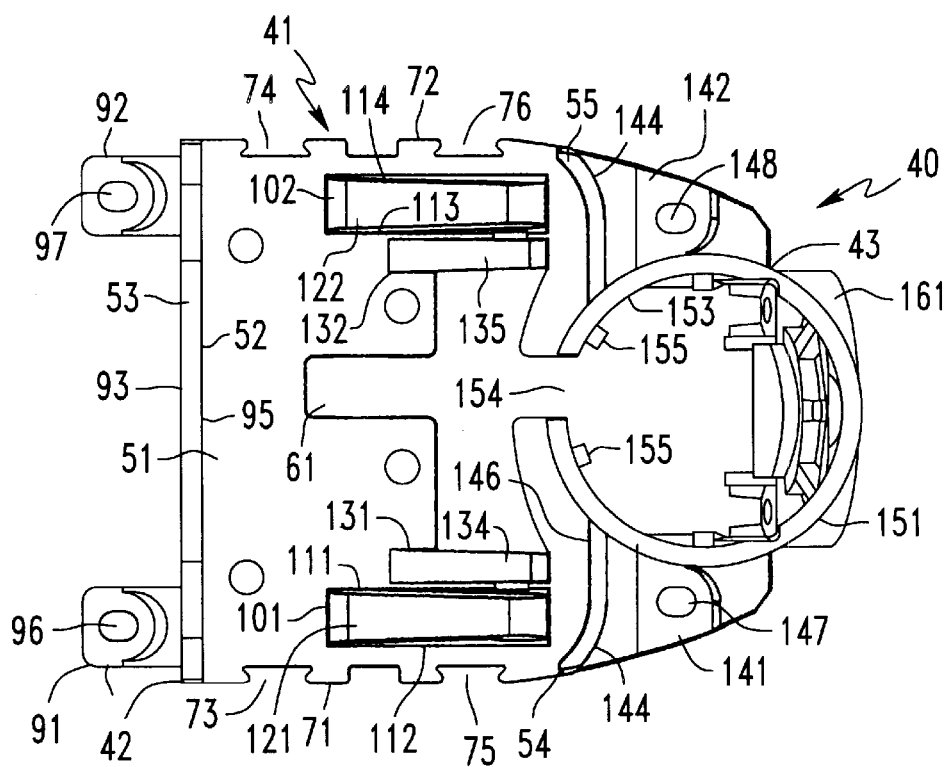
FIG. 10 is a top view of the one piece molded carrier of FIGS. 8 and 9.
Figure 11:
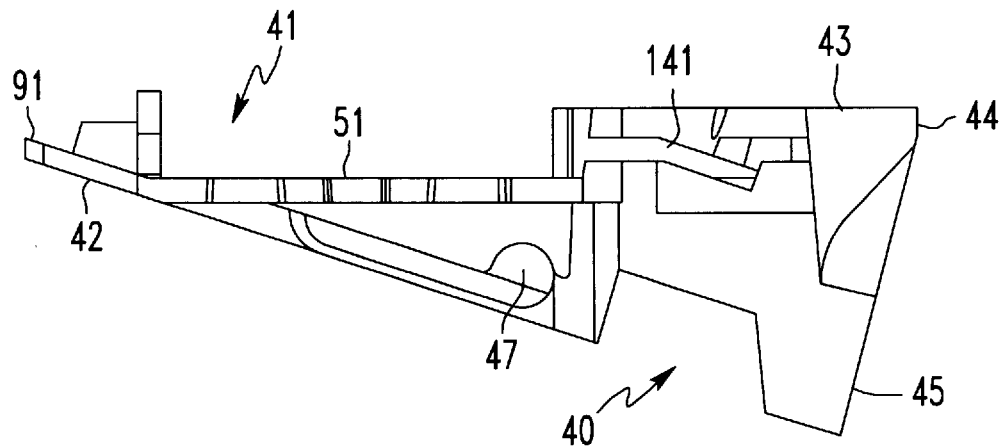
FIG. 11 is a side view of the one piece molded carrier of FIGS. 8–10.
Figure 12:
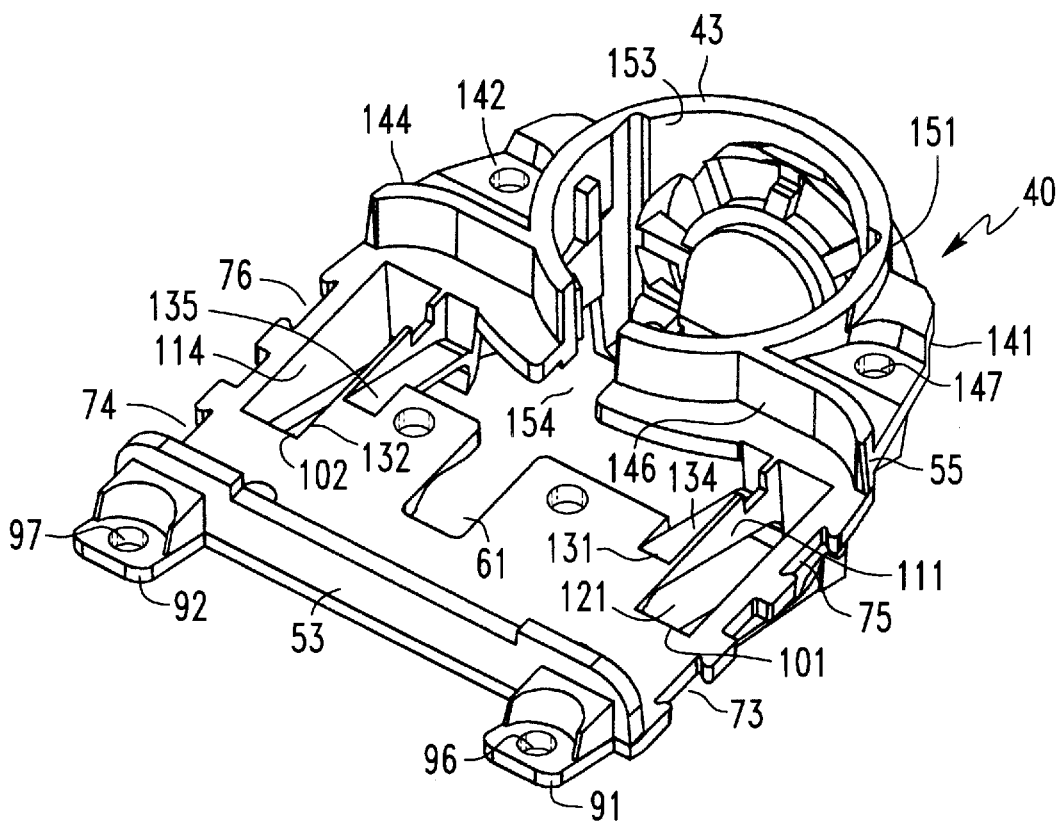
FIG. 12 is a top perspective view of the one piece molded carrier of FIGS. 8–11.
Figure 13:
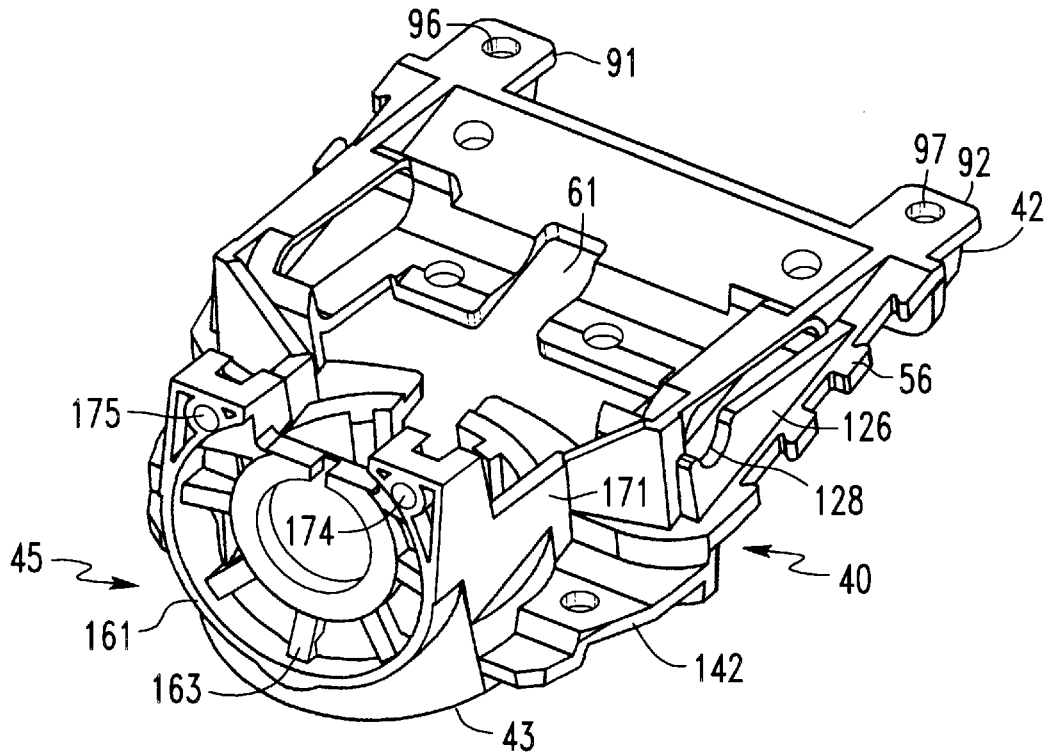
FIG. 13 is a bottom perspective view of the one piece molded carrier of FIGS. 8–12.
Figure 14:
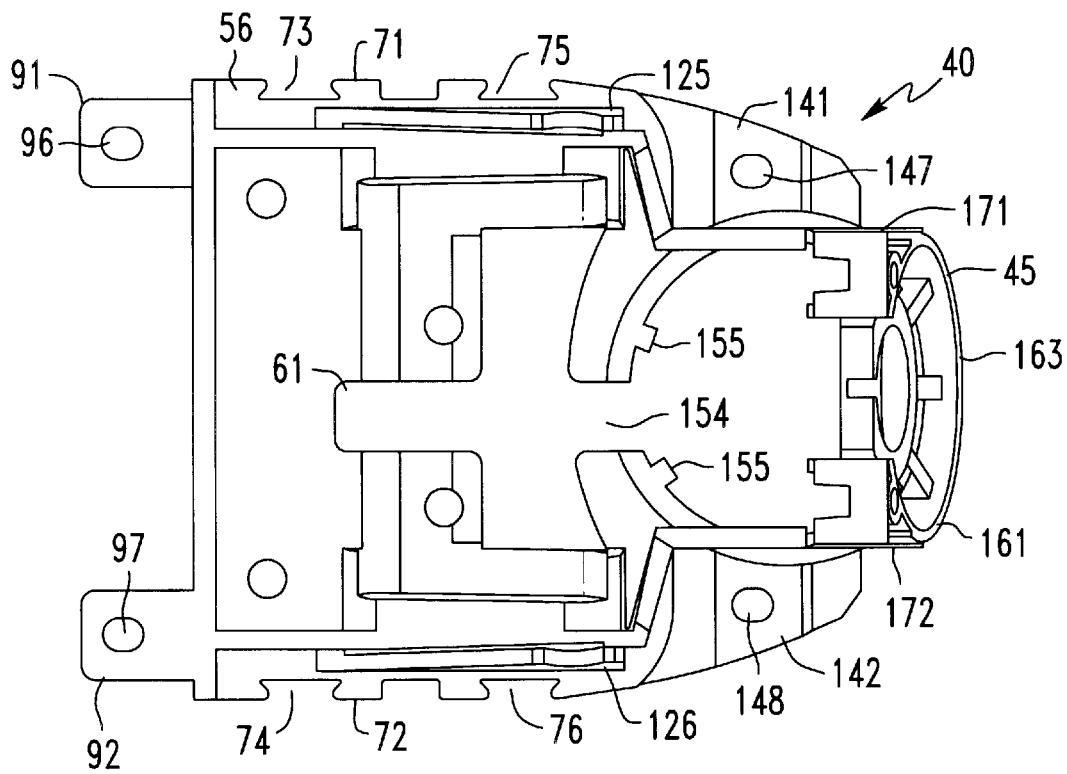
FIG. 14 is a bottom view of the one piece molded carrier of FIGS. 8–13.

FIGS. 1–3 diagrammatically illustrate a telephone craftsperson's test set, that is generally configured as described and illustrated in the above-referenced applications, as comprising a multi-section rear housing portion 20 and a front housing portion 30. The rear housing portion 20 has a battery door for accessing a battery compartment and first or top end 21, to which a craftsperson's belt clip 22 is attached. Rear housing portion also includes a second or bottom end 23 having a communication cord access port 24. The front housing portion 30 has a front face 31 containing a keypad 32, an earpiece receiver port 33, a microphone port (grill) 34, and a display panel face 35. The display panel face 35 has a lens 36 that overlies a visual display device, such as a liquid crystal display panel unit, that is shock-mounted within the front housing portion 30 of the test set. As will be described with reference to FIGS. 4–14, the LCD panel unit is integrally mounted in a shock-resistant and moisture-resistant, single-piece carrier configuration, that supports the LCD panel unit and a plurality of other test set components within a wedge-shaped portion of the interior volume of the test set, subtended by an end region 37 of the front housing portion 30.

More particularly, as shown in FIGS. 4–14, the single piece mounting structure of the present invention is illustrated diagrammatically as comprising a generally wedge-shaped, multiple component carrier 40, made of a material, such as molded polycarbonate plastic, as a non-limiting example. Carrier 40 has a generally flat, LCD panel unit-mounting section 41 that extends to a tapered end 42 of the carrier, and a generally cylindrical or circular, earpiece receiver-mounting section 43 that is contiguous with a wider end 44 of the carrier, and is generally parallel to the generally flat, LCD panel unit-mounting section 41. The plastic carrier 40 is also configured to include a cylindrical speaker-mounting section 45, that is adjacent to and oriented generally transverse to the earpiece receiver-mounting section 43 at its wider end 44, and a desiccant-retaining section 47 underlying the LCD panel unit-mounting section 41.

The LCD panel unit-mounting section 41 of the carrier 40 has a generally flat floor or base region 51, which is sized to receive a lower rubber mounting gasket 180 of a shock-absorbing LCD panel unit laminate arrangement 200, to be described. Laminate arrangement 200 also includes an LCD panel unit 210 and an upper rubber mounting gasket 80. Floor region 51 is bounded at a first end 52 by a first, generally linear end wall 53 and at a second end 54 by a second, generally curvilinear end wall 55, which adjoins the earpiece receiver-mounting section 43.

The floor region 51 of the carrier has an interior cross-shaped aperture 61, that is sized and shaped to accommodate passage therethrough of components that make up LCD panel unit 210 and an earpiece receiver 60, in the course of assembly. The carrier's floor region 51 also has a pair of side edges 71 and 72, in which respective pairs of slots 73, 75 and 74, 76 are formed. These slots serve to capture respective pairs of inverted T-shaped tines 83, 85 and 84, 86 of upper LCD mounting gasket 80, to be described, so that the T-ends of the tines abut against the underside 56 of the floor region 51.

The tapered end 42 of the carrier 40 further includes a pair of attachment feet 91 and 92 that are solid with and extend away from a side 93 of end wall 53 opposite to the side 95 facing the floor region 51. The attachment feet 91 and 92 have respective holes 96 and 97 for receiving generally cylindrical mounting bosses, that are molded into the interior of the front housing portion 30 in which the carrier 40 is installed.

Interiorly offset from the side edges 71 and 72 and extending vertically downward from the underside 56 of floor region 51 are respective wedge-shaped retention troughs 101 and 102, which form the desiccant-retaining section 47 of the carrier. The troughs have respective interior sidewalls 111, 113, outer sidewalls 112, 114 and adjoining ramp surfaces 121 and 122. The sidewalls of the troughs have openings sized to accommodate a set of desiccant sticks 105 (e.g., four as a non-limiting example) distributed along the ramp surfaces of the troughs. The desiccant sticks 105 serve to reduce the dew point within the test set to a value in a range on the order of 0°–65° F., and thereby prevent 'fogging' the LCD panel unit (for example, as may otherwise occur when the test set is taken from an air-conditioned vehicle to a warm and humid outdoor environment).

To prevent the desiccant sticks 105 from becoming dislodged from the ends of their retention troughs, respective wedge-shaped strakes 125 and 126 extend from the underside 56 of the floor region 51 adjacent to the outer sidewalls 112 and 114, as shown. Generally circular apertures 127 and 128 are formed in the respective strakes 125 and 126 to facilitate insertion of the desiccant sticks 105 into the retention troughs. A pair of smaller troughs 131 and 132 extend from the underside 56 of the floor region 51 adjacent to the troughs 101 and 102. The respective ramp surfaces 134 and 135 of these smaller troughs 131 and 132 partially overhang the ends of installed desiccant sticks 105, so as to prevent upward vertical movement of the installed desiccant sticks.

The wider end 44 of the carrier 40 further includes a pair of attachment feet 141 and 142 that are solid with and a side 144 of the generally curvilinear end wall 55, opposite to the side 146 thereof facing the floor region 51, and also adjoining the cylindrical earpiece receiver-mounting section 43. These additional attachment feet 141 and 142 also have respective holes 147, 148 for receiving generally cylindrical mounting bosses molded into the interior of the front housing portion 30.

The earpiece receiver-mounting section 43 has an exterior cylindrical wall surface 151 and an interior cylindrical wall surface 153. The interior cylindrical wall surface 153 is sized to accommodate the circular earpiece receiver 60, which rests upon a set of interior columns 155 distributed around the interior wall surface 153 of the earpiece receiver-mounting section 43. The cylindrical wall of earpiece receiver-mounting section 43 has a slot or gap 154, which provides access between the interior region 157 of the earpiece receiver-mounting section 43 and the cross-shaped aperture 61 of floor region 51. This slot 154 is sized to accommodate the thickness of an earpiece receiver 60 turned sideways, so that the earpiece receiver 60 may be inserted into the carrier 40 from beneath the floor section 51 by way of its aperture 61 and then rotated ninety degrees to an upright condition and installed in the earpiece receiver-mounting section 43.

The earpiece receiver-mounting section 43 extends to and is contiguous with the speaker-mounting section 45, which is oriented generally transverse thereto. The speaker-mounting section 45 has a cylindrical wall 161 that is sized to accommodate the circular exterior of a speaker 100. The speaker 100 rests upon a set of interior ribs 163 distributed radially between the interior wall surface 161 of the speaker-mounting section 45 and a central cylindrical bore that is sized to receive the base and signal wires of speaker 100. In its installed position immediately adjacent to a plurality of audio transmission slots 29 in the top end 21 of the rear housing portion 20 of the test set, the speaker 100 serves as an auxiliary audio output device (speakerphone).

The cylindrical wall 161 of the speaker-mounting section 45 is also contiguous with a pair of outer walls 171 and 172, which extend to and are solid with the desiccant retention troughs 101, 102 beneath the floor region 51 of the generally flat, LCD panel unit-mounting section 41. Outer walls 171 and 172 have respective bores 174 and 175, which are sized to receive mounting screws that pass through corresponding bores 178 and 179 on opposite sides of the audio transmission slots 29 in the top end 21 of the rear housing portion 20 of the test set, thereby affixing the speaker-retaining, wider end 44 of the carrier 40 next to the audio slots of the test set.

As described above, the floor region 51 of LCD panel unit-mounting section 41 of the carrier 40 is sized to receive the lower mounting gasket 180 of the LCD unit laminate arrangement 200. Like the side edges 71 and 72 of the floor region 51 of the LCD unit-mounting section 41, the lower mounting gasket 180 contains corresponding pairs of slots 183, 185 and 184, 186 in respective side edges 181 and 182, which are alignable with the slots 73, 75 and 74, 76 of floor region 51 and are sized to receive strap portions 193, 195 and 194, 196 of the respective pairs of inverted T-shaped tines 83, 85 and 84, 86 of the upper LCD mounting gasket 80.

The lower mounting gasket 180 is preferably made of a flexible, durable shock absorbing material such as silicon rubber, and has a generally flat floor region 201, which is sized to receive LCD panel unit 210. The floor region 201 of lower mounting gasket 180 has a generally elongated slot 203 that is sized to allow passage therethrough of a set of in-line connector leads 205, to which a connector at one end of a flexible ribbon cable 206 of the LCD panel unit 210 is connected. The other end of the ribbon cable 206 has a connector (not shown), which is connected to the main printed circuit board of the test set.

The lower mounting gasket 180 is bounded at a first end by a first, generally linear end wall 213 and at a second end by a second, generally curvilinear end wall 221, which adjoins the earpiece receiver-mounting section 43. End walls 213 and 221 are sized to snugly fit between the end walls 53 and 55 bounding the floor region 51 of the LCD panel unit-mounting section 41, so that slots 183, 185 and 184, 186 in the lower mounting gasket 180 are aligned with the slots 73, 75 and 74, 76 of floor region 51. The top surface 223 of end wall 213 of the lower mounting gasket 180 has a series of depressions 225, which provide interior atmospheric communication between the LCD panel unit 210 and the desiccant sticks 105, so that the dew point of the LCD panel will be that of the desiccant sticks 105, preventing the LCD panel from fogging up, as described above.

The upper mounting gasket 80 is configured similar to the lower mounting gasket 180, being formed of a flexible, shock-absorbing material, such as silicon rubber. Upper mounting gasket 80 has a first window 231 that conforms with the display face 212 of the LCD panel unit 210, and a second generally half-arcuate shaped window 233 that is sized to receive a like shaped printed circuit board 240 containing one or more light emitting diodes (LEDs) 241, and a generally half-arcuate shaped LED cover plate 243. LED cover plate 243, which is press fit into the window 233 in the upper mounting gasket 80 together with printed circuit board 240, has a set of viewing apertures 245 therein aligned with and accommodating LEDs 241 of the printed circuit board 240. Wiring for the printed circuit board passes through the generally elongated slot 203 of the lower mounting gasket 180.

The upper mounting gasket 80 is bounded at a first end by an end wall 263 and at a second end by a second, generally curvilinear, stepped end wall 267, which adjoins the earpiece receiver-mounting section 43. End wall 263 has a vertical thickness that is effective to define an aperture adjacent to the series of depressions 225 in the end wall 213 of the lower mounting gasket 180, so as to vent the LCD panel unit 210 to the desiccant sticks 105, as described above. In addition, the upper mounting gasket 80 is dimensioned so that its end wall 263 snugly fits against end wall 213 of the lower mounting gasket 180, when the tines 83, 85 and 84, 86 are aligned with and are captured in the slots 183, 185 and 184, 186 of the lower mounting gasket 180 and the slots 73, 75 and 74, 76 of floor region 51 of the LCD unit-mounting section 41 of the carrier 40.

Integrally molded with and projecting from the generally curvilinear, stepped end wall 267 of the upper mounting gasket 80 is a dual gasket 290. Dual gasket 290 is comprised of a first ring-shaped receiver gasket portion 292 and a second generally ring-shaped speaker gasket portion 294, that is spaced apart but connected to the first ring-shaped gasket portion 292 by a connecting bridge portion 296 therebetween. The receiver gasket portion 292 is sized to fit atop the circular earpiece receiver 60, that is captured within the interior cylindrical wall surface 153 of the earpiece receiver-mounting section 43, as described above. Similarly, the speaker gasket portion 294 is sized to fit with the interior of the cylindrical wall 161 of the speaker-mounting section 45 atop the circular speaker 100. Speaker gasket portion 294 has a pair of holes 295 and 297, which are aligned with the respective bores 174 and 175 of walls 171 and 172 of the speaker-mounting section 45, for receiving mounting screws for affixing the speaker end 44 of the carrier 40 next to the audio slots of the test set, as described above.

Integrated assembly of the various display and audio components described above into the single piece carrier structure of the present invention is straightforward. The auxiliary speaker 100 is readily installed in the speaker-mounting section 45, with the pair of speaker wires (not shown) passing through the opening between the walls 171 and 172. The earpiece receiver 60 is inserted through the aperture 61 in the carrier floor section 51, through the slot 155, and then rotated to an upright condition and installed in the earpiece receiver-mounting section 43.

The laminate arrangement 200 is then assembled, with the LCD panel unit 210 captured between the upper mounting gasket 80 and the lower mounting gasket 180, and with the ribbon cable for the LCD panel unit connected to its in-line connector leads 205 via the elongated slot 203 in the lower mounting gasket 180. Also, the wires for the LED printed circuit board 240, which together with cover plate 243 is press fit into the window 233 in the upper mounting gasket 80, passes through the generally elongated slot 203 of the lower mounting gasket 180.

The inverted T-shaped tines of the upper mounting gasket 80 are installed in their associated slots in the lower mounting gasket 180 and floor region of the carrier, and captured against the underside 56 of the carrier adjacent to the slots 73, 75 and 74, 76 of floor region 51 of the LCD unit-mounting section 41 of the carrier 40. The receiver gasket portion 292 and the speaker gasket portion 294 of the dual gasket 290 are then installed into the earpiece receiver-mounting section 43, and the speaker-mounting section 45, as described above.

The holes 295 and 297 of the speaker gasket portion 294 will be now be aligned with the respective bores 174 and 175 of walls 171 and 172 of the speaker-mounting section 45, so that they may receive mounting screws that affix the speaker end 44 of the carrier 40 next to the audio slots of the test set. To complete the assembly, desiccant sticks are inserted into the retention troughs of the desiccant-retaining section 47 underlying the LCD panel unit-mounting section 41, and the mounting structure is installed in the wedge-shaped portion of the interior volume of the test set, at the end region 37 of the front housing portion 30 of the test.

As will be appreciated from the foregoing description, the present invention provides an integrated, mounting configuration for plural, delicate components of a telephone test set, that is not only physically robust, and provides a barrier against the effects of humidity, such as the fogging of a viewing panel, but does so using a single piece carrier, that is configured to fit within the relatively confined physical volume of a curvilinear hand-conformal test set.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. An arrangement for mounting a plurality of components within a utility device comprising a unitary carrier having a first portion configured to support a display panel in a shock-resilient manner adjacent to a viewing panel of said utility device, and a second portion configured to support an acoustic transducer adjacent to an acoustic coupling port of said utility device, and wherein said carrier is configured to maintain a visibility condition of said display panel irrespective of ambient humidity conditions in which said utility device is used, and including a third portion which contains a material that is fluid communication with said first portion and is operative to maintain said visibility condition of said display panel irrespective of ambient humidity conditions in which said utility device is used.

2. An arrangement according to claim 1, wherein said material comprises a desiccant.

3. An arrangement according to claim 1, wherein said second portion of said carrier is configured to support said acoustic transducer adjacent to an earpiece receiver port of said utility device.

4. An arrangement according to claim 3, wherein said carrier is further configured to support a further acoustic transducer adjacent to an auxiliary speaker port of said utility device.

5. An arrangement according to claim 1, wherein said second portion of said carrier is configured to support said acoustic transducer adjacent to a speaker port of said utility device.

6. An arrangement according to claim 1, wherein said utility device comprises a telephone test set.

7. An arrangement according to claim 1, wherein said first portion of said carrier is configured to support a shock absorbing structure containing said display panel adjacent to said viewing panel of said utility device.

8. An arrangement according to claim 7, wherein said shock absorbing structure comprises shock-absorbing mounting gaskets disposed on opposite sides of said display panel and being secured to said first portion of said carrier.

9. An arrangement according to claim 7, wherein said shock absorbing structure comprises an upper shock-absorbing mounting gasket disposed atop said display panel, and a lower shock-absorbing mounting gasket disposed between said display panel and said first portion of said carrier, and wherein said upper shock-absorbing mounting gasket is configured to attach said display panel and said lower shock-absorbing mounting gasket to said first portion of said carrier.

10. An arrangement according to claim 9, wherein said upper shock-absorbing mounting gasket is configured to engage said display panel, said lower shock-absorbing mounting gasket and said first portion of said carrier.

11. An arrangement according to claim 9, wherein said first portion of said carrier has a generally flat floor region configured to support said lower shock-absorbing mounting gasket, and wherein said upper shock-absorbing upper mounting gasket has attachment elements that are configured to engage said display panel, said lower shock-absorbing mounting gasket and said first portion of said carrier.

12. An arrangement according to claim 11, wherein said attachment elements are configured as generally T-shaped tines.

13. An arrangement according to claim 1, wherein said carrier is configured to generally conform with a tapered interior volume portion of a telephone test set.

14. An arrangement according to claim 1, wherein said first portion of said carrier is configured to support a shock-absorbing structure containing said display panel adjacent to said viewing panel of said utility device, said shock absorbing structure comprising a pair of shock-absorbing mounting gaskets disposed on opposite sides of said display panel and being secured to a generally flat floor region of said carrier, and wherein said third portion of said carrier is located beneath said generally flat floor region thereof.

15. An arrangement according to claim 8, wherein said utility device comprises a telephone test set and wherein said second portion of said carrier is adjacent to said generally flat floor region and is configured to support said acoustic transducer adjacent to an earpiece receiver port of said telephone test set.

16. An arrangement according to claim 15, wherein said carrier is further configured to support a further acoustic transducer adjacent to an auxiliary speaker port of said telephone test set.

17. An arrangement according to claim 16, wherein said carrier is configured to generally conform with a tapered interior volume portion of a telephone test set, such that said first portion is located at a display panel portion of said test set adjacent to a keypad thereof, said second portion is disposed adjacent to an earpiece receiver port of said telephone test set, and said auxiliary speaker port is adjacent to an end portion of said telephone test set.

18. An arrangement according to claim 17, wherein said display device comprises a liquid crystal display panel.

19. An arrangement according to claim 17, wherein said carrier is configured to be installed in a housing portion of said test set exclusive of a battery compartment housing portion containing batteries for powering said test set.

20. An arrangement according to claim 1, wherein said utility device comprises a telephone test set, and said carrier is shaped, so as to generally conform with a tapered interior volume portion of said telephone test set, and wherein said first portion of said carrier comprises a generally flat, display panel unit-mounting section that is located at a display panel portion of said test set adjacent to a keypad thereof, and extends to a first end of said carrier, and wherein said second portion of said carrier comprises an earpiece receiver-mounting section that is contiguous with a second end of said carrier, and is generally parallel to said generally flat, display panel unit-mounting section, and further including a speaker-mounting section adjacent and generally transverse to said earpiece receiver-mounting section, adjacent to an auxiliary speaker port at an end portion of said telephone test set, and a desiccant-retaining section disposed beneath said display panel unit-mounting section.

21. An arrangement according to claim 20, wherein said display panel unit-mounting section has a generally flat floor region sized to receive a lower shock-absorbing mounting gasket of a display panel unit laminate structure that includes said display panel unit and an upper, shock-absorbing upper mounting gasket.

22. An arrangement according to claim 21, wherein said floor region of said display panel unit-mounting section has an aperture that accommodates passage therethrough of components of said display panel unit and said earpiece receiver.

23. An arrangement according to claim 21, wherein said desiccant-retaining section disposed beneath said display panel unit-mounting section comprises troughs arranged to support a plurality of desiccant elements.

24. An arrangement according to claim 21, wherein said upper mounting gasket has a window that conforms with a display face of said display panel unit, and further includes an integrally molded dual gasket, comprised of an earpiece receiver gasket portion sized to fit with said circular earpiece receiver and a speaker gasket portion sized to fits with said speaker-mounting section.

25. An arrangement for mounting a display panel and acoustic transducer components within a housing sub-portion of a telephone test set, said housing sub-portion containing a keypad, an earpiece receiver port, a display panel face, and an auxiliary speaker port at an end portion thereof, said arrangement comprising a generally wedge-configured carrier having a generally flat, display panel unit-mounting section upon which a shock-absorbing gasket assembly containing said display panel is mounted, an earpiece receiver-mounting section that is contiguous with a wider end of said carrier, and is contiguous with said generally flat, display panel unit-mounting section, and an auxiliary speaker-mounting section adjacent and transverse to said earpiece receiver-mounting section, and further including a desiccant-retaining section adjacent to said display panel unit-mounting section.

26. An arrangement according to claim 25, wherein said shock-absorbing gasket assembly comprises a pair of shock-absorbing mounting gaskets disposed on opposite sides of said display panel and being secured to said display panel unit-mounting section of said carrier.

27. An arrangement according to claim 26, wherein said shock absorbing structure comprises an upper shock-absorbing mounting gasket disposed atop said display panel, and a lower shock-absorbing mounting gasket disposed between said display panel and said display panel unit-mounting section of said carrier, and wherein said upper shock-absorbing mounting gasket is configured to attach said display panel and said lower shock-absorbing mounting gasket to said carrier.

28. An arrangement according to claim 27, wherein said upper shock-absorbing mounting gasket is configured to engage said display panel, said lower shock-absorbing mounting gasket and said carrier.

29. An arrangement according to claim 28, wherein said carrier has a generally flat floor region configured to support said lower shock-absorbing mounting gasket, and wherein said upper, shock-absorbing upper mounting gasket has attachment elements that are configured to engage said display panel, said lower shock-absorbing mounting gasket and said carrier.

30. An arrangement according to claim 29, wherein said housing sub-portion is exclusive of a housing portion containing batteries for powering said test set.

31. An arrangement according to claim 30, wherein said floor region of said display panel unit-mounting section has an aperture that accommodates passage therethrough of components of said display panel unit and said earpiece receiver.

32. An arrangement according to claim 25, wherein said desiccant-retaining section disposed beneath said display panel unit-mounting section comprises troughs arranged to support a plurality of desiccant elements.

33. An arrangement according to claim 27, wherein said upper mounting gasket has a window that conforms with a display face of said display panel unit, and further includes an integrally molded dual gasket, comprised of an earpiece receiver gasket portion sized to fit with said circular earpiece receiver and a speaker gasket portion sized to fits with said speaker-mounting section.

* * * * *